US012630894B2

(12) United States Patent (10) Patent No.: US 12,630,894 B2
Suehiro et al. (45) Date of Patent: May 19, 2026

(54) LINEAR GROOVE FORMATION METHOD AND METHOD OF PRODUCING GRAIN-ORIENTED ELECTRICAL STEEL SHEET

(71) Applicant: JFE STEEL CORPORATION, Tokyo (JP)

(72) Inventors: Ryuichi Suehiro, Tokyo (JP); Takeshi Omura, Tokyo (JP); Shigehiro Takajo, Tokyo (JP); Yoshihisa Ichihara, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 330 days.

(21) Appl. No.: 17/997,044

(22) PCT Filed: Mar. 26, 2021

(86) PCT No.: PCT/JP2021/013086
§ 371 (c)(1),
(2) Date: Oct. 25, 2022

(87) PCT Pub. No.: WO2021/229933
PCT Pub. Date: Nov. 18, 2021

(65) Prior Publication Data
US 2023/0212703 A1 Jul. 6, 2023

(30) Foreign Application Priority Data
May 15, 2020 (JP) ................................ 2020-086267

(51) Int. Cl.
*C21D 8/1277* (2026.01)
*B23K 26/364* (2014.01)
(Continued)

(52) U.S. Cl.
CPC .......... *C21D 8/1277* (2013.01); *B23K 26/364* (2015.10); *B23K 26/402* (2013.01);
(Continued)

(58) Field of Classification Search
CPC .. C21D 8/1277; C21D 8/1222; C21D 8/1233; C21D 8/1261; C21D 8/1272; C21D 9/46;
(Continued)

(56) References Cited

U.S. PATENT DOCUMENTS 4,863,531 A * 9/1989 Wada .................... C21D 8/1294
148/113
2012/0028069 A1* 2/2012 Sakai ........................ C21D 9/46
428/593
(Continued)

FOREIGN PATENT DOCUMENTS

CN 103097557 A 5/2013
CN 104726672 A 6/2015
(Continued)

OTHER PUBLICATIONS

Jan. 15, 2024, Office Action issued by the China National Intellectual Property Administration in the corresponding Chinese Patent Application No. 202180031699.6 with English language search report.
(Continued)

*Primary Examiner* — Rebecca Janssen
*Assistant Examiner* — Mayela Aldaz
(74) *Attorney, Agent, or Firm* — KENJA IP LAW PC

(57) ABSTRACT

To form linear grooves of desired groove width on a metal strip surface and provide a grain-oriented electrical steel sheet having excellent magnetic properties, a linear groove formation method comprises: forming a resist coating on at least one surface of a metal strip; thereafter irradiating the resist coating with a laser while scanning the laser in a
(Continued)

direction crossing a rolling direction of the metal strip, to remove the resist coating in a part irradiated with the laser; and thereafter performing etching treatment to form a linear groove in a part of the metal strip in which the resist coating is removed, wherein the resist coating contains a predetermined amount of an inorganic compound, and on the surface of the metal strip, the laser has a predetermined elliptic beam shape.

5 Claims, 4 Drawing Sheets

(51) Int. Cl.

| | |
|---|---|
| *B23K 26/402* | (2014.01) |
| *C21D 8/1216* | (2026.01) |
| *C21D 8/1244* | (2026.01) |
| *C21D 9/46* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/60* | (2006.01) |
| *H01F 1/16* | (2006.01) |

(52) U.S. Cl.
CPC ......... *C21D 8/1222* (2013.01); *C21D 8/1233* (2013.01); *C21D 8/1261* (2013.01); *C21D 8/1272* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/60* (2013.01); *H01F 1/16* (2013.01); *C22C 2202/02* (2013.01)

(58) Field of Classification Search
CPC .. B23K 26/364; B23K 26/402; C22C 38/001; C22C 38/002; C22C 38/02; C22C 38/04; C22C 38/06; C22C 38/60; C22C 2202/02; H01F 1/16
See application file for complete search history.

(56) References Cited

U.S. PATENT DOCUMENTS

| | | | |
|---|---|---|---|
| 2013/0139932 A1 | 6/2013 | Sakai et al. | |
| 2017/0369960 A1 | 12/2017 | Kwon et al. | |
| 2018/0119242 A1 | 5/2018 | Kobayashi | |
| 2018/0147663 A1* | 5/2018 | Takajo | C23F 1/28 |
| 2020/0058434 A1* | 2/2020 | Zhao | C21D 8/1222 |
| 2021/0130922 A1 | 5/2021 | Kwon et al. | |

FOREIGN PATENT DOCUMENTS

| | | | | |
|---|---|---|---|---|
| CN | 107109512 A | 8/2017 | | |
| CN | 107849631 A | 3/2018 | | |
| CN | 108660303 A | 10/2018 | | |
| CN | 110100018 A | 8/2019 | | |
| EP | 2207050 A2 | 7/2010 | | |
| EP | 3604565 A1 * | 2/2020 | .......... | B23K 26/364 |
| EP | 3257973 B1 | 8/2021 | | |
| EP | 3330388 B1 | 9/2021 | | |
| JP | 2017025377 A | 2/2017 | | |
| KR | 1020180074131 A | 7/2018 | | |
| WO | 2016092858 A1 | 6/2016 | | |
| WO | 2016129235 A1 | 8/2016 | | |
| WO | 2017017908 A1 | 2/2017 | | |
| WO | 2018117672 A1 | 6/2018 | | |

OTHER PUBLICATIONS

Jun. 15, 2021, International Search Report issued in the International Patent Application No. PCT/JP2021/013086.
Sep. 6, 2023, the Extended European Search Report issued by the European Patent Office in the corresponding European Patent Application No. 21805006.0.
Jan. 7, 2025, Office Action issued by the Korean Intellectual Property Office in the corresponding Korean Patent Application No. 10-2022-7038257 with English language concise statement of relevance.

* cited by examiner

Rolling direction

LINEAR GROOVE FORMATION METHOD AND METHOD OF PRODUCING GRAIN-ORIENTED ELECTRICAL STEEL SHEET

TECHNICAL FIELD

The present disclosure relates to a linear groove formation method of forming linear grooves on a metal strip surface, and a method of producing a grain-oriented electrical steel sheet using the linear groove formation method.

BACKGROUND

Grain-oriented electrical steel sheets having excellent magnetic properties are mainly used as materials for iron cores of transformers, and are required to have lower iron loss in order to improve the energy use efficiency of transformers. One of known techniques for reducing the iron loss of grain-oriented electrical steel sheets is a method of surface-treating a steel sheet.

The iron loss reduction technique of surface-treating a steel sheet involves introducing strain to the surface of the steel sheet by a physical method and refining the magnetic domain width to reduce iron loss. One such technique is a method of forming grooves on the surface of a steel sheet by etching. Specifically, the following method is known: A coating agent for resist coating formation is applied in a pattern to a steel sheet surface before formation of a forsterite film using a gravure roll or the like, and then the parts to which the coating agent for resist coating formation is not applied are selectively etched by electrolytic etching or the like to form grooves on the steel sheet surface. With this method, the magnetic domains of the steel sheet surface are refined by forming the grooves, so that the iron loss of the grain-oriented electrical steel sheet can be reduced.

It is known that the magnetic properties of a grain-oriented electrical steel sheet having such linear grooves formed at its surface are significantly influenced by the shape of the linear grooves. When the depth (groove depth) of the linear grooves in the sheet thickness direction is deeper, more magnetic charge forms on the wall surfaces of the linear grooves and the magnetic domain refining effect increases. It is therefore preferable to form deep grooves. Meanwhile, when forming the linear grooves by etching, if the amount of electrolysis, i.e. the reduction quantity of the steel substrate due to the linear groove formation, increases, the magnetic flux density decreases and the hysteresis loss increases. Hence, the amount of electrolysis is preferably small. To reduce the amount of electrolysis, the groove width is preferably narrow. Moreover, if the linear grooves after the etching are not uniform in groove shape, the magnetic properties of the grain-oriented electrical steel sheet vary. It is therefore preferable to form a uniform resist coating pattern and form uniform linear grooves on the steel sheet surface.

As a technique of forming a uniform resist coating pattern and forming uniform linear grooves to suppress variation in the magnetic properties of a steel sheet, WO 2017/017908 A1 (PTL 1) describes forming a resist coating pattern using a laser. In detail, the technique described in PTL 1 uniformly forms a resist coating on the whole steel sheet surface and then irradiates the parts where resist coating is not necessary with a laser to instantaneously gasify the resist coating and selectively remove the resist coating in the irradiated parts. With the method described in PTL 1, the formation of linear grooves of a uniform shape is expected. PTL 1 also describes reducing the beam diameter of the laser applied and making the shape of the laser closer to a perfect circle to enable formation of narrow-width linear grooves.

CITATION LIST

Patent Literature

PTL 1: WO 2017/017908 A1

SUMMARY

Technical Problem

With the conventional technique, however, there is a possibility that, despite the steel sheet surface being irradiated with a small-diameter beam, the groove width after etching is greater than the beam diameter and the desired groove width cannot be obtained.

It could therefore be helpful to form linear grooves of desired groove width on a metal strip surface and provide a grain-oriented electrical steel sheet having excellent magnetic properties.

Solution to Problem

Upon careful examination, we discovered the following.

(1) In a region in which the groove width after etching is larger than the beam diameter in a direction (hereafter also referred to as "scanning orthogonal direction") orthogonal to the scanning direction of the laser on the metal strip surface, the width (hereafter also referred to as "resist coating removal width") in the scanning orthogonal direction of the part in which the resist coating is removed is not greater than the beam diameter (hereafter also referred to as "irradiation width") in the scanning orthogonal direction, but there is also a part (heat-affected zone) in which the resist coating is altered due to laser heat. This heat-affected zone is removed in the etching, causing an increase in the groove width of the linear groove.

(2) When irradiating the resist coating with a laser having a beam shape that has the same beam diameter in the scanning direction of the laser and the scanning orthogonal direction, i.e. a beam shape close to a perfect circle, the width (hereafter also referred to as "heat-affected width") of the heat-affected zone in the scanning orthogonal direction after the laser irradiation is large in the case where energy is charged concentratedly in a short time, and is small in the case where energy is charged dispersedly in time. Hence, reducing the laser power is effective in reducing the heat-affected width. However, simply reducing the laser power is likely to cause insufficient removal of the resist coating. In the case of reducing the laser power, the laser scanning rate needs to be decreased in order to charge sufficient energy to the resist coating. A decrease in the laser scanning rate, however, leads to a decrease in productivity. An effective method that can be used instead of laser power reduction is to change the beam shape on the metal strip surface from a perfect circle-like shape to an elliptic shape. By using an elliptic beam shape, energy charging is dispersed in time even with the same laser power and the heat-affected width decreases, so that the increase of the groove width of the linear groove can be prevented. To achieve this effect, the ratio of the major axis length to the minor axis length of the beam shape of the laser needs to be 5.0 or more.

(3) In the case where the elliptic beam shape is used, the irradiation energy is dispersed spatially, and the resist coating removal performance degrades. An effective way of reducing the energy required for resist coating removal and reliably removing the resist coating even in the case of applying the laser with the elliptic beam shape is to use a resist coating containing an inorganic compound. The removal of a resist coating by a laser is achieved by gasifying an organic compound contained in the resist coating, and the energy of the laser is used to gasify the organic compound. In the case where the resist coating contains an inorganic compound, when the organic compound in the resist coating is gasified by laser irradiation, the inorganic compound in the resist coating scatters as dust and thus is removed. Hence, the energy required to gasify the same volume of the organic compound as the inorganic compound in the resist coating can be saved. To reliably remove the resist coating by the elliptic laser, the content of the inorganic compound in the resist coating needs to be 20 mass % or more in terms of solid content.

The present disclosure is based on these discoveries. We thus provide the following.

[1] A linear groove formation method comprising: forming a resist coating on at least one surface of a metal strip; thereafter irradiating the resist coating with a laser while scanning the laser in a direction crossing a rolling direction of the metal strip, to remove the resist coating in a part irradiated with the laser; and thereafter performing etching treatment to form a linear groove in a part of the metal strip in which the resist coating is removed, wherein the resist coating contains 20 mass % or more of an inorganic compound in terms of solid content, and on the surface of the metal strip, the laser has an elliptic beam shape whose ratio of a major axis length to a minor axis length is 5.0 or more, and has a beam diameter of 10 μm or more and 100 μm or less in a direction orthogonal to a scanning direction of the laser.

[2] The linear groove formation method according to [1], wherein an irradiation energy of the laser is 30 Jim or less.

[3] A method of producing a grain-oriented electrical steel sheet, the method comprising: subjecting a steel slab to hot rolling to obtain a hot-rolled steel sheet; thereafter subjecting the hot-rolled steel sheet or a hot-rolled and annealed sheet obtained by performing hot-rolled sheet annealing on the hot-rolled steel sheet, to cold rolling once or to cold rolling twice or more with intermediate annealing being performed therebetween, to obtain a cold-rolled steel sheet; thereafter subjecting the cold-rolled steel sheet to primary recrystallization annealing to obtain a primary recrystallized sheet; and thereafter subjecting the primary recrystallized sheet to secondary recrystallization annealing to obtain a secondary recrystallized sheet, wherein linear grooves are formed on at least one surface of the steel sheet after the hot rolling, by the linear groove formation method according to [1] or [2].

Advantageous Effect

It is thus possible to form linear grooves of desired groove width on a metal strip surface and provide a grain-oriented electrical steel sheet having excellent magnetic properties.

DETAILED DESCRIPTION

Experiments that led to the development of the presently disclosed techniques will be described below. In the following description, "%" is mass % unless otherwise stated. Herein, each numeric value range expressed in the form of "A to B" denotes a range that includes values A and B as its lower and upper limits.

Experiment 1

Figure 1:
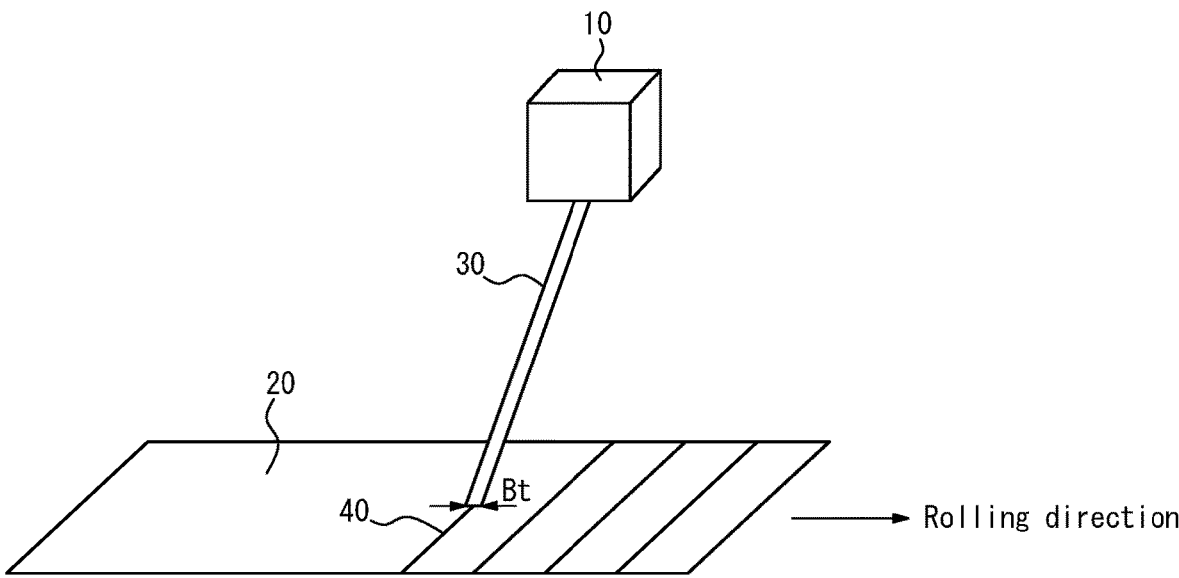
FIG. 1 is a diagram schematically illustrating laser irradiation.

As illustrated in FIG. 1, while passing, in the direction of the arrow, a cold-rolled steel sheet (C: 0.05%, Mn: 0.10%, P: 0.004%, S: 0.001%, Al: 0.008%, N: 45 ppm, Ti+Nb+V+Zr+Ta<0.001%) of 0.23 mm in sheet thickness having a resist coating (solid content composition: water-based alkyd resin: 36%, melamine resin: 1%, Ti-containing oxide: 20%, aluminum-containing oxide: 40%, other components (pigment, leveling agent): 3%) formed on its surface, laser irradiation was performed by scanning a laser irradiation device in a direction orthogonal to a rolling direction (the direction of travel of the steel sheet in the drawing), to remove the resist in a laser irradiated part 40. The cold-rolled steel sheet was produced by hot rolling a steel slab to obtain a hot-rolled steel sheet and then cold rolling the hot-rolled steel sheet to obtain a cold-rolled steel sheet. The laser irradiation was repeatedly performed at spacings of 5 mm in the rolling direction. A fiber laser was used as the laser, and the fiber of the laser irradiation device was changed to change the beam diameter (Bt in the drawing) in the scanning orthogonal direction on the steel sheet surface in a range of 5 μm to 300 μm. As the laser, a single mode fiber laser was applied by a galvanoscanner method, with a laser irradiation energy of 25 J/m, a scanning width of 200 mm, and a scanning spacing in the rolling direction of the steel sheet of 5 mm. Under all conditions, the resist coating in the laser irradiated part was completely removed.

The beam diameter in the scanning orthogonal direction of the laser was determined in the following manner: The intensity profile of the beam in the scanning orthogonal direction of the laser was measured on the steel sheet surface using a commercially available CCD camera type fixed beam profiler, and the profile width between two points at which the beam intensity was 0.135 times the maximum beam intensity in the beam profile was taken to be the beam diameter in the scanning orthogonal direction.

The cold-rolled steel sheet from which the resist coating had been removed was then subjected to electrolytic etching treatment. The cold-rolled steel sheet after the electrolytic etching treatment was then subjected to primary recrystallization annealing to obtain a primary recrystallized sheet, and thereafter an annealing separator was applied to both surfaces (i.e. both sides) of the primary recrystallized sheet. The primary recrystallized sheet on which the annealing separator had been applied was then subjected to secondary recrystallization annealing also serving as forsterite film formation, to obtain a secondary recrystallized sheet. Following this, the secondary recrystallized sheet was subjected to flattening annealing, and then coated with a tension coating to produce a grain-oriented electrical steel sheet (product sheet). The grain-oriented electrical steel sheet was used to study the relationship between the groove width of linear grooves and the iron loss.

Regarding the iron loss, the iron loss $W_{17/50}$ at a magnetic flux density of 1.7 T and an excitation frequency of 50 Hz was evaluated by a single sheet tester in accordance with JIS C2556. For the measurement of the iron loss, magnetic property measurement was performed before grooving (before electrolytic etching treatment), and each grain-oriented electrical steel sheet with a magnetic flux density $B_8$ of 1.90 T was selected and used. The depth (groove depth) in the sheet thickness direction of the linear grooves formed by subjecting the grain-oriented electrical steel sheet to the electrolytic etching treatment was adjusted to be equal in all grain-oriented electrical steel sheets by regulating the electrolytic etching treatment time. Regarding the groove width of the linear grooves in the grain-oriented electrical steel sheet, the groove part was measured three-dimensionally using a confocal laser microscope, and the distance in the rolling direction between two points of 95% in height with the lowermost part of the groove therebetween when the height profile was measured in the rolling direction was taken to be the groove width, where the height of the lowermost part of the groove was 0% and the average height of the rolled surface was 100%. The groove width was measured at ten points at spacings of 1 mm in the sheet transverse direction, and the measured values were averaged to yield the groove width.

Figure 2:
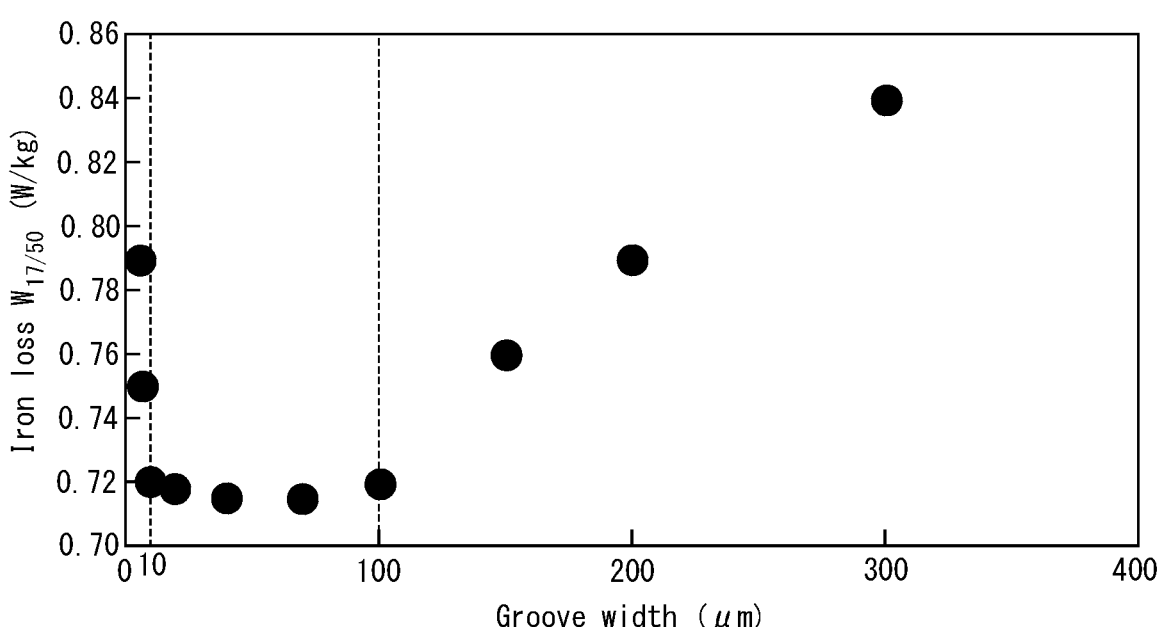
FIG. 2 is a diagram illustrating the relationship between the groove width of linear grooves and the iron loss $W_{17/50}$.

FIG. 2 illustrates the results. As can be seen from the drawing, the iron loss property was favorable when the groove width was 10 μm to 100 μm. The reason why the iron loss increased as a result of the increase of the groove width is considered to be because the hysteresis loss increased as the amount of electrolysis increased. The reason why the iron loss property degraded when the groove width was excessively narrow is considered to be because coupling of magnetic poles occurred and the magnetic domain refining effect decreased. Given that the groove width of the linear grooves approximately matches the beam diameter (Bt in FIG. 1) in the scanning orthogonal direction of the laser, it is important to limit the beam diameter in the scanning orthogonal direction of the laser to 10 μm to 100 μm for iron loss reduction.

Experiment 2

Next, the relationship between the major-to-minor axis ratio of the beam diameter in the scanning orthogonal direction of the laser and the groove width of linear grooves after etching was studied. In this experiment, an oscillator with a laser beam diameter of 100 μm was employed, and a cylindrical lens was used to convert the beam shape on the steel sheet into an elliptic shape. The steel sheet was then irradiated with the laser so that the major axis direction of the beam shape would be parallel to the scanning direction of the laser and the minor axis direction of the beam shape would be perpendicular to the scanning direction of the laser. Here, the major-to-minor axis ratio was changed in a range of 1 to 200. The major-to-minor axis ratio is the ratio of the major axis length to the minor axis length of the beam shape on the steel sheet surface. After irradiating each cold-rolled steel sheet with a laser of a different major-to-minor axis ratio to remove its resist coating, the cold-rolled steel sheet was etched. The groove width of linear grooves in the cold-rolled steel sheet after the etching was examined. As the steel sheet in which the linear grooves were formed, the same steel sheet as in Experiment 1 was used. The cold-rolled steel sheet was produced by hot rolling a steel slab to obtain a hot-rolled steel sheet and then cold rolling the hot-rolled steel sheet to obtain a cold-rolled steel sheet. The cold-rolled steel sheet after the etching treatment was subjected to primary recrystallization annealing to obtain a primary recrystallized sheet, and thereafter an annealing separator was applied to both surfaces of the primary recrystallized sheet. The primary recrystallized sheet on which the annealing separator had been applied was then subjected to secondary recrystallization annealing also serving as forsterite film formation, to obtain a secondary recrystallized sheet. Following this, the secondary recrystallized sheet was subjected to flattening annealing, and then coated with a tension coating to produce a grain-oriented electrical steel sheet (product sheet). The laser irradiation was performed with the same laser irradiation energy, scanning width, and scanning spacing in the rolling direction of the steel sheet as in Experiment 1.

Figure 3:
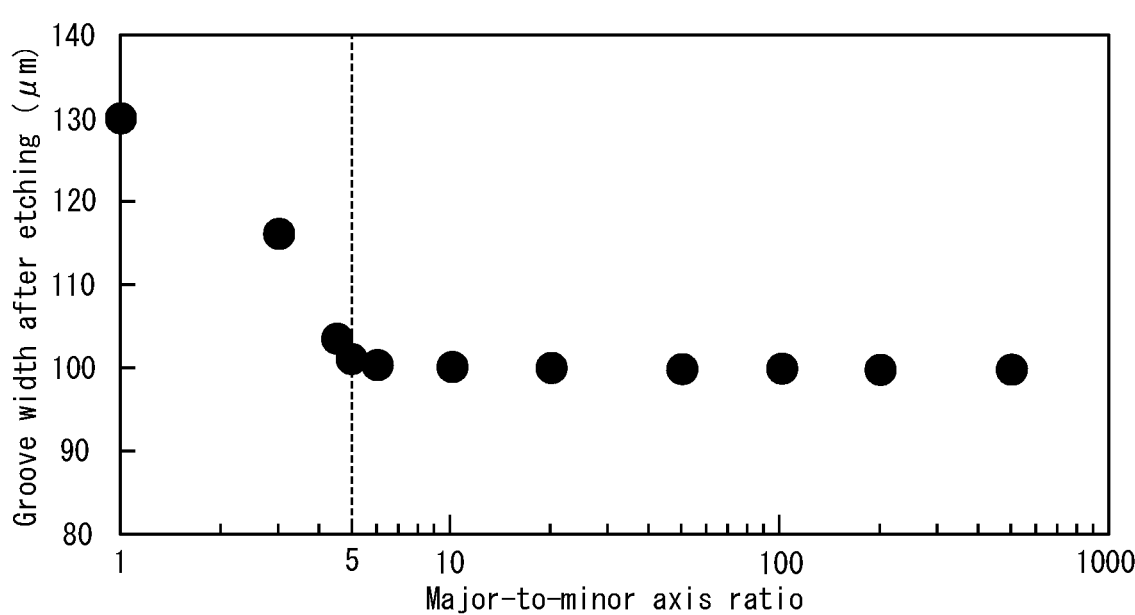
FIG. 3 is a diagram illustrating the relationship between the major-to-minor axis ratio of a laser and the groove width after etching.

FIG. 3 illustrates the results. The groove width of the linear grooves after the etching tended to increase when the major-to-minor axis ratio of the beam was less than 5.0. This is considered to be because, when the major-to-minor axis ratio of the beam was low, i.e. when a laser having a perfect circle-like beam shape was applied, a large amount of energy was charged in a narrow region in a short time in the case where the laser power was equal, and part of the energy was transmitted as heat in the scanning orthogonal direction by thermal conduction and altered the resist coating in the region not irradiated with the laser to thus cause a heat-affected zone. Because of poor adhesion of the resist coating in the heat-affected zone in the etching as compared with the unaltered part, the heat-affected zone was removed from the steel sheet in the etching, resulting in a larger groove width after the etching than the beam diameter in the scanning orthogonal direction of the laser. Given that the iron loss property degraded when the groove width of the linear grooves was more than 100 μm as illustrated in FIG. 2, the increase of the groove width due to the heat-affected zone is not desirable.

Experiment 3

Figure 4:
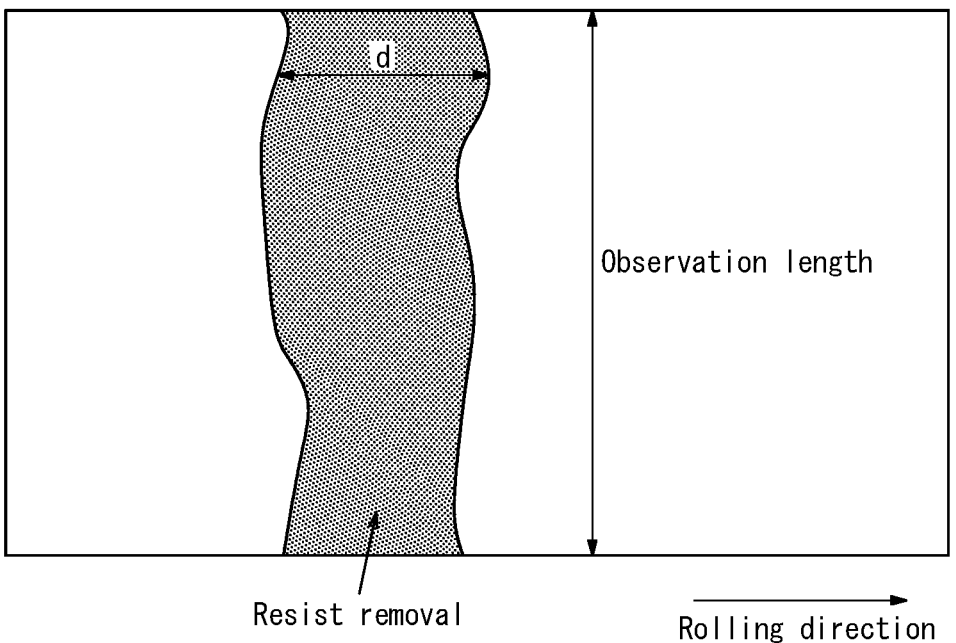
FIG. 4 is a diagram for explaining a resist coating removal width measurement method.

By using an elliptic beam, the increase of the groove width of the linear grooves can be prevented. However, since the beam energy density is dispersed, there is a possibility of insufficient removal of the resist coating. For the purpose of reducing the laser irradiation energy required for the removal of the resist coating, the influence of the inorganic compound content in the resist coating on the resist coating removal was studied. Alkyd-based resin (modified alkyd resin, organic compound) and silica (inorganic compound) were mixed to prepare a resist coating having an inorganic compound content of 0 mass % to 95 mass % in terms of solid content. The prepared resist coating was formed on both surfaces of a cold-rolled steel sheet, and the resist coating was irradiated with a laser to remove the resist coating in the laser irradiated part in the same way as in Experiment 1. The beam shape on the steel sheet surface was adjusted to be an elliptic shape having a minor axis length of 100 μm and a major-to-minor axis ratio of 50, and laser irradiation was performed so that the major axis of the beam would be parallel to the scanning direction and the minor axis of the beam would be perpendicular to the scanning direction. After the laser irradiation, the resist coating removal width was measured. Herein, the resist coating removal width is the average value of the width d of the resist removed part in the sheet transverse direction (TD) (i.e. direction orthogonal to the rolling direction) in a length (observation length) of 1 mm in the laser scanning direction when observing the resist removed part after the laser irradiation using a microscope as illustrated in FIG. 4. The ratio (hereafter also referred to as "resist removal ratio") of the resist removal width to the beam diameter (beam minor axis length of 100 μm in this experiment) of each laser in the scanning orthogonal direction was then calculated in percentage. As the steel sheet, the same steel sheet as in Experiment 1 was used. The cold-rolled steel sheet was produced by hot rolling a steel slab to obtain a hot-rolled steel sheet and then cold rolling the hot-rolled steel sheet to obtain a cold-rolled steel sheet. The laser irradiation was performed with the same laser irradiation energy, scanning width, and scanning spacing in the rolling direction of the steel sheet as in Experiment 1.

Figure 5:
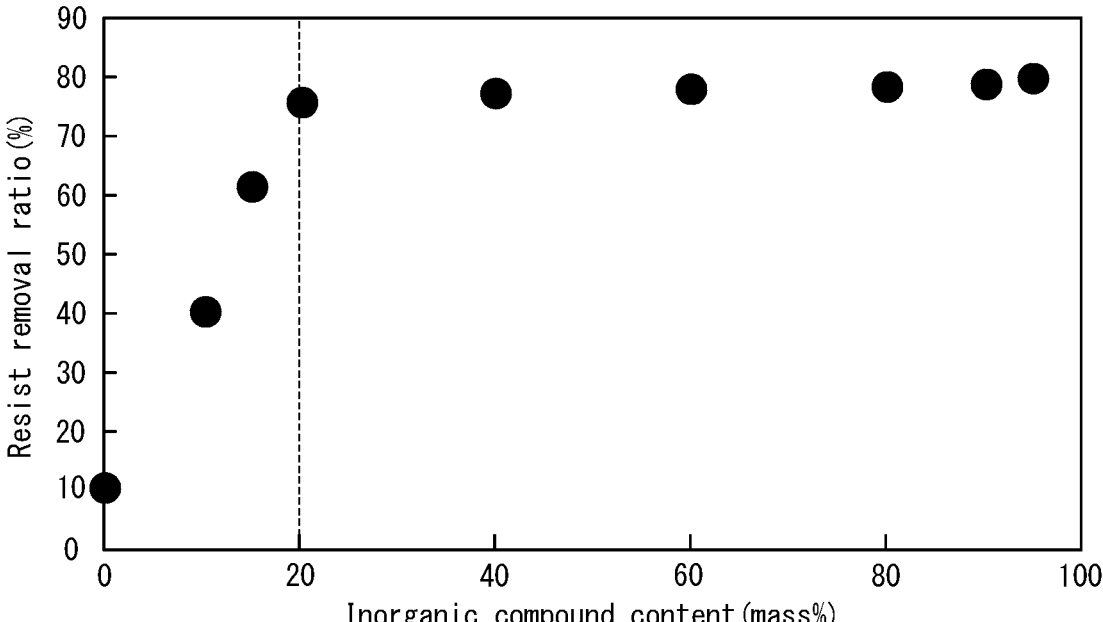
FIG. 5 is a diagram illustrating the relationship between the inorganic compound content in a resist coating and the ratio of the resist coating removal width to the diameter in the scanning orthogonal direction of a laser.

FIG. 5 illustrates the results. When the inorganic compound content was less than 20 mass %, the resist coating removal ratio decreased significantly. As mentioned above, when a resist coating is irradiated with a laser, an organic compound in the resist coating is instantaneously gasified to remove the resist coating. Meanwhile, an inorganic compound in the resist coating scatters as dust and thus is removed, when the organic compound around the inorganic compound is gasified. Hence, the energy required to gasify the same volume of the organic compound as the inorganic compound in the resist coating can be saved. Accordingly, in the case of using a resist coating having an inorganic compound content of 20 mass % or more, the resist coating can be uniformly removed even with low laser irradiation energy. If the resist removal ratio decreases, a region (resist removed part) in which the steel substrate is exposed and a region in which the resist coating remains are mixed in the laser irradiated part. In such a case, the etching rate of the steel substrate in the etching tends to be uneven, which causes ununiform groove width and leads to variation in magnetic properties. It is therefore important to contain 20 mass % or more of an inorganic compound in a resist coating in terms of solid content.

Based on the foregoing results, one of the disclosed embodiments will be described below. The following description merely concerns one preferred embodiment, and the present disclosure is not limited by the following description.

A linear groove formation method according to this embodiment is a linear groove formation method comprising: forming a resist coating on at least one surface of a metal strip; thereafter irradiating the resist coating with a laser while scanning the laser in a direction crossing a rolling direction of the metal strip, to remove the resist coating in a part irradiated with the laser; and thereafter performing etching treatment to form a linear groove in a part of the metal strip in which the resist coating is removed, wherein the resist coating contains 20 mass % or more of an inorganic compound in terms of solid content, and on the surface of the metal strip, the laser has an elliptic beam shape whose ratio of a major axis length to a minor axis length is 5.0 or more, and has a beam diameter of 10 μm or more and 100 μm or less in a direction orthogonal to a scanning direction of the laser.

In the linear groove formation method according to this embodiment, a metal strip is subjected to the following processes (1) to (3) in sequence:

(1) resist coating formation process,
(2) laser irradiation process, and
(3) etching treatment process.

[Metal Strip]

With the linear groove formation method according to this embodiment, when forming linear grooves on a steel sheet surface using etching, linear grooves of narrow groove width can be formed in a uniform shape for various types of metal strips. Hence, the type of the metal strip subjected to linear groove formation is not limited. Given that the linear groove formation method according to this embodiment is particularly useful for iron loss reduction in grain-oriented electrical steel sheets, it is preferable to use the linear groove formation method in the production of grain-oriented electrical steel sheets.

When performing etching treatment in the below-described etching treatment process, if a coating other than the resist coating is formed on the surface of the metal strip, the etching may be hindered. Accordingly, it is preferable that any coating insoluble or poorly-soluble in an etchant or an electrolytic solution, such as a forsterite film, an insulating coating, and a tension coating, is not formed on the surface of the metal strip and the below-described coating agent for resist coating formation is directly applied to the surface of the metal strip.

[Resist Coating Formation Process]

First, a coating agent for resist coating formation is applied to at least one surface (i.e. at least one side) of the metal strip, to form a resist coating on the at least one surface of the metal strip. The resist coating functions as an etching resist coating that prevents etching of the metal strip in the coated part in the below-described etching treatment process.

(Resist Coating)

The resist coating contains 20 mass % or more of an inorganic compound (or inorganic compounds) in terms of solid content. If the inorganic compound content in the resist coating is less than 20 mass % in terms of solid content, when the resist coating is irradiated with a laser having an elliptic beam shape of a high major axis length ratio in the below-described laser irradiation process, the resist coating cannot be removed sufficiently, and linear grooves of desired groove width cannot be formed. The inorganic compound content in the resist coating is preferably 40 mass % or more in terms of solid content. If the inorganic compound content is excessively high, the content of a resin component decreases, as a result of which the etching resistance decreases and uniform groove formation is hindered. Accordingly, the inorganic compound content in the resist coating is preferably 90 mass % or less in terms of solid content.

(Inorganic Compound)

The inorganic compound is not limited as long as it is a known inorganic compound. For example, silica, magnesium oxide, Ti-containing oxide, silica, Zr-containing oxide, glass fiber, and the like may be used singly or in a mixture of two or more.

The solid content in the resist coating other than the inorganic compound includes an organic compound (or organic compounds) as a resin component. The resin component in the resist coating is preferably thermosetting resin. For example, the thermosetting resin is at least one selected from the group consisting of alkyd-based resin, epoxy-based resin, polyethylene-based resin, and melamine-based resin. Examples of the alkyd-based resin include resin obtained by causing alkyd resin to react with a polymerizable vinyl monomer, where the alkyd resin is obtained as a result of polybasic acid, polyhydric alcohol, and fat and oil or a fat and oil processed product undergoing dehydration condensation reaction and optionally further undergoing reaction with monobasic acid. Examples of the epoxy-based resin include bisphenol type epoxy resin, novolak type epoxy resin, and glycidyl ethers of polyhydric alcohols. Examples of the melamine-based resin include methylated melamine and butylated melamine.

The coating agent for resist coating formation may contain a solvent as appropriate, besides the solid content such as the above-described organic compound and inorganic compound. Examples of the solvent include known solvents such as ethylene glycol mono-n-butyl ether and diethylene glycol mono-n-butyl ether. The content of the solvent in the coating agent for resist coating formation is not limited, but the viscosity of the coating agent for resist coating formation is preferably high from the viewpoint of suppressing ink dripping of the coating agent for resist coating formation.

The method of applying the coating agent for resist coating formation to at least one surface of the metal strip is not limited and may be any method, but it is preferable to use a method of applying the coating agent for resist coating formation to the surface of any type of roll and bringing the roll into contact with the metal strip surface to transfer the coating agent for resist coating formation on the roll surface to the metal strip surface. In particular, it is preferable to apply the coating agent for resist coating formation to the metal strip surface by a gravure printing method using a gravure roll. It is preferable to apply the coating agent for resist coating formation to the metal strip surface by a gravure offset printing method using an offset roll. Herein, the term "gravure printing method" refers to all kinds of printing methods using gravure rolls, including the gravure offset printing method. In the case of using the gravure printing method, it is preferable to install a doctor blade above the gravure roll to make the amount of the coating agent for resist coating formation on the gravure roll surface uniform, in order to make the thickness of the resist coating uniform.

When applying the coating agent for resist coating formation to the metal strip, the temperature of the coating agent for resist coating formation is preferably 40° C. or less, to maintain high viscosity of the coating agent for resist coating formation. Although no lower limit is placed on the temperature of the coating agent for resist coating formation when applying the coating agent for resist coating formation, the temperature is preferably 20° C. or more from the viewpoint of production technology.

The coating amount (application amount) of the resist coating is preferably 1.0 g/m$^2$ or more per one surface (i.e. per one side). The coating amount of the resist coating is preferably 10.0 g/m$^2$ or less per one surface. As a result of the coating amount of the resist coating being 1.0 g/m$^2$ or more, favorable resist resistance is achieved, so that etching can be appropriately performed in the below-described etching treatment. As a result of the coating amount of the resist coating being 10.0 g/m$^2$ or less, the resist coating can be appropriately removed even in the case where the irradiation energy of the laser is 30 J/m or less. The coating amount of the resist coating is the value after the resist coating drying and before the laser irradiation, and is derived from the difference in weight between the metal strip before the resist coating application and the metal strip after the resist coating drying and the resist coating application area.

After applying the coating agent for resist coating formation to at least one surface of the metal strip to form the resist coating, the resist coating is dried before the below-described etching treatment. Preferably, the resist coating is dried before the below-described laser irradiation. The method of drying the coating agent for resist coating formation is not limited, and may be, for example, hot-air drying or vacuum drying. In the case of hot-air drying, the drying temperature is preferably 180° C. to 300° C. In the case of vacuum drying, the pressure is preferably 10 Pa or less, and the drying time is preferably 5 sec or more.

[Laser Irradiation Process]

Following this, the metal strip on which the resist coating is formed is irradiated with a laser, while scanning the laser in a direction crossing the rolling direction of the metal strip. By this laser irradiation, the resist coating in the part irradiated with the laser is locally heated to gasify, thus being removed. As a result, a resist removed part in which the surface of the metal strip is exposed is formed. The exposed part in the resist removed part is selectively etched in the below-described etching treatment process, to form a linear groove.

(Laser)

If the beam shape of the laser on the metal strip surface is close to a perfect circle, a heat-affected zone forms around the laser irradiated part unless the laser power is reduced. The heat-affected zone is removed in the etching, which leads to an increase in groove width. Thus, the formation of the heat-affected zone is not desirable from the viewpoint of forming linear grooves of narrow width and enhancing the iron loss reduction effect particularly in grain-oriented electrical steel sheets. In view of this, the metal strip surface is irradiated with a laser whose beam shape on the metal strip surface (steel sheet surface) is an elliptic shape, while preferably scanning the laser so that the major axis of the beam shape will be parallel to the scanning direction and the minor axis of the beam shape will be orthogonal to the scanning direction. Thus, energy charging by the laser is dispersed in time, and consequently the formation of the heat-affected zone is suppressed. To suppress the formation of the heat-affected zone, the major-to-minor axis ratio, i.e. the ratio of the major axis length to the minor axis length, of the beam shape is 5.0 or more. The major-to-minor axis ratio of the beam is preferably 20 or more, more preferably 50 or more, and further preferably 100 or more, from the viewpoint of suppressing the increase of the groove width of linear grooves after the etching treatment to form linear grooves of desired groove width and enhance the iron loss reduction effect particularly in grain-oriented electrical steel sheets. Although no upper limit is placed on the major-to-minor axis ratio of the beam, the major-to-minor axis ratio is preferably 100000 or less. As a result of the major-to-minor axis ratio of the beam being 100000 or less, the beam can be prevented from protruding from the width edges of the metal strip, and the costs for protecting the production line from the protruding beam can be saved. The major axis direction of the beam shape is preferably parallel to the scanning direction of the laser, but the effects of the presently disclosed techniques can be obtained even in the case where the major axis direction is not parallel to the scanning direction. The angle of the major axis direction of the beam shape to the scanning direction of the laser is preferably 30° or less, and more preferably 10° or less. Methods of making the beam shape of the laser on the metal strip surface elliptic include, for example, a method using a semiconductor laser that emits light in an elliptic shape, a method of converting a circular laser beam into an ellipse with a cylindrical lens, and a method of reflecting a laser on a rotationally-driven polygon mirror to make it elliptic. The irradiation angle of the laser on the metal strip surface may be adjusted to make the beam shape on the metal strip surface elliptic.

The ratio of the major axis length to the minor axis length of the beam shape is measured in the following manner: The intensity profile of the beam in the major axis direction of the laser is measured on the metal strip surface using a commercially available CCD camera type fixed beam profiler, and the profile width between two points at which the beam intensity is 0.135 times the maximum beam intensity in the beam profile is taken to be the beam diameter (major axis length) in the major axis direction. The beam diameter (minor axis length) of the laser in the minor axis direction is measured in the same way, and the major axis length is divided by the minor axis length to yield the major-to-minor axis ratio.

The beam diameter in the scanning orthogonal direction of the laser is 10 $\mu$m or more and 100 $\mu$m or less, from the viewpoint of achieving excellent iron loss property particularly in grain-oriented electrical steel sheets. The beam diameter in the scanning orthogonal direction is measured in the following manner: The intensity profile of the beam in the scanning orthogonal direction of the laser is measured on the metal strip surface using a commercially available CCD camera type fixed beam profiler, and the profile width between two points at which the beam intensity is 0.135 times the maximum beam intensity in the beam profile is taken to be the beam diameter in the scanning orthogonal direction. In the case where the major axis direction of the beam shape matches the scanning direction of the laser, the minor axis length of the beam shape is the beam diameter in the scanning orthogonal direction.

Higher laser irradiation energy lowers the possibility of insufficient removal of the resist coating. However, from the viewpoint of preventing the metal strip from melting and forming linear grooves of a more uniform shape, the laser irradiation energy is preferably 40 J/m or less, more preferably 30 J/m or less, and further preferably 10 J/m or less. Although no lower limit is placed on the laser irradiation energy, the laser irradiation energy is preferably 3 J/m or more in order to appropriately remove the resist coating.

The type of the laser can be determined in view of the productivity and, for grain-oriented electrical steel sheets, further in view of the iron loss property. Since narrow groove width is advantageous from the viewpoint of improving the iron loss property of the grain-oriented electrical steel sheet, it is preferable to use a laser device having high focusing property to narrow the resist coating removal width. Meanwhile, laser scanning needs to be performed at high speed from the viewpoint of the productivity. In the case of performing laser scanning at high speed, it is preferable to use a laser irradiation device of higher power in order to ensure the energy density required for the removal. To achieve both high beam focusing property and high laser power, the type of the laser is preferably a single mode fiber laser. The laser is preferably scanned by rotational driving of mirrors such as galvanometer mirrors or polygon mirrors, from the viewpoint of high speed scanning.

Most of commonly used metal strips are about 1 m in sheet width. To irradiate a metal strip of about 1 m in sheet width with a laser more uniformly throughout its sheet width, it is preferable to use two or more laser irradiation devices.

The laser is preferably scanned linearly. The scanning direction of the laser is any direction crossing the rolling direction of the metal strip.

In the laser irradiation process, the resist coating in the laser irradiated part is removed as a result of the gasification of the organic compound and the scattering of the inorganic compound. Accordingly, it is preferable to collect the removed resist coating by blast or suction using at least one of a dust collector and an exhaust gas cleaning device, after the laser irradiation process. The removed resist coating may be collected by blast or suction while performing laser irradiation. The air flow rate of the dust collector or the exhaust gas cleaning device in the case of performing blast or suction while performing laser irradiation is preferably 100 m³/min or less, in order to keep the metal strip from vibrating and becoming out of focus due to blast or suction. Although no lower limit is placed on the air flow rate, the air flow rate is preferably 10 m³/min or more from the viewpoint of appropriately collecting the removed resist coating.

[Etching Treatment Process]

After the laser irradiation process, etching treatment is performed to form linear grooves on the surface of the metal strip. The method of etching is not limited, but it is preferable to use at least one of chemical etching and electrolytic etching. From the viewpoint of controlling the groove depth of the linear grooves in the sheet thickness direction, it is more preferable to use electrolytic etching. In the case of using chemical etching, for example, an aqueous solution containing at least one selected from the group consisting of $FeCl_3$, $HNO_3$, HCl, and $H_2SO_4$ may be used as an etchant. In the case of using electrolytic etching, for example, an aqueous solution containing at least one selected from the group consisting of NaCl, KCl, $CaCl_2$, and $NaNO_3$ may be used as an etchant (electrolytic solution).

The etching treatment is preferably performed while stirring the etchant. Stirring the etchant resolves any deviation of the temperature and substance concentration of the electrolytic solution in the etching bath, and enables more uniform etching. Stirring the etchant also increases the flow rate of the electrolytic solution in the etching bath, and improves the etching efficiency. The method of stirring is not limited. For example, mechanical stirring using a stirring member or stirring by circulating the etchant may be used. In the case of mechanical stirring, a stirring member made of resin is preferably used from the viewpoint of the resistance to the etchant. In the case of stirring by circulation, for example, an etchant jetting port is provided in the etching bath so that the etchant can be jetted from the jetting port using a pump or the like.

In the case of performing the etching treatment by electrolytic etching, current may be applied to the metal strip by any method. For example, an etching bath of radial cell type or horizontal cell type may be used to apply current to the metal strip in a direct manner or an indirect manner. The electrolysis conditions in the current passage may be adjusted as appropriate depending on the type of the steel sheet to be etched, the electrolytic solution used, etc. For example, the current density may be adjusted in a range of 1 A/dm² to 100 A/dm².

The groove width and the groove depth of the linear grooves formed by the etching treatment can be adjusted by the beam shape of the laser and the etching conditions. The groove width of the linear grooves is preferably 10 $\mu$m or more and preferably 100 $\mu$m or less, from the viewpoint of improving the magnetic properties of the grain-oriented electrical steel sheet. The depth of the linear grooves in the sheet thickness direction is preferably 10 $\mu$m or more. The depth of the linear grooves in the sheet thickness direction is preferably 40 $\mu$m or less. In the linear groove formation method according to this embodiment, the groove width of the linear grooves and the resist removal width approximately match. Accordingly, the beam diameter in the scanning orthogonal direction of the laser is preferably 10 $\mu$m or more. The beam diameter in the scanning orthogonal direction of the laser is preferably 100 μm or less.

In the linear groove formation method, the conditions other than the above-described conditions may comply with conventional methods.

In addition to the above-described resist coating formation process, laser irradiation process, and etching treatment process, the linear groove formation method may comprise an imaging process of capturing a magnified image of the laser irradiated part by an imaging device in order to monitor the resist coating removal state, after the laser irradiation process (2) and before the etching treatment process (3). The imaging device supplies the captured image to an analysis device. The analysis device determines the resist removal ratio, based on the image acquired from the imaging device and the beam diameter in the scanning orthogonal direction of the laser. This resist removal ratio can be used to adjust the laser irradiation conditions and the like. The resist removal ratio may also be recorded for use in product management. Since the groove shape changes depending on the resist coating removal state in the laser irradiated part, the groove width may be monitored instead of the resist coating removal state. However, given that the groove shape is also influenced by factors other than the resist coating removal, it is more preferable to directly monitor the resist coating removal state before the groove formation.

<Method of Producing Grain-Oriented Electrical Steel Sheet>

The linear groove formation method according to this embodiment can be suitably used in the production of grain-oriented electrical steel sheets. A method of producing a grain-oriented electrical steel sheet according to this embodiment is a method of producing a grain-oriented electrical steel sheet, comprising: subjecting a steel slab to hot rolling to obtain a hot-rolled steel sheet; thereafter subjecting the hot-rolled steel sheet or a hot-rolled and annealed sheet obtained by performing hot-rolled sheet annealing on the hot-rolled steel sheet, to cold rolling once or to cold rolling twice or more with intermediate annealing being performed therebetween, to obtain a cold-rolled steel sheet; thereafter subjecting the cold-rolled steel sheet to primary recrystallization annealing to obtain a primary recrystallized sheet; and thereafter subjecting the primary recrystallized sheet to secondary recrystallization annealing to obtain a secondary recrystallized sheet, wherein linear grooves are formed on at least one surface of the steel sheet after the hot rolling, by the above-described linear groove formation method.

In the case of using the linear groove formation method to produce a grain-oriented electrical steel sheet, the metal strip subjected to the linear groove formation may be the steel sheet in any stage after hot rolling. More specifically, the metal strip subjected to the groove formation may be a hot-rolled steel sheet after hot rolling, a hot-rolled and annealed sheet obtained by subjecting the hot-rolled steel sheet to hot-rolled sheet annealing, a cold-rolled steel sheet after cold rolling in the case where cold rolling is performed once, a cold-rolled steel sheet before or after intermediate annealing or a cold-rolled steel sheet after cold rolling following intermediate annealing in the case where cold rolling is preformed twice or more with intermediate annealing being performed therebetween, a primary recrystallized sheet after primary recrystallization annealing, or a secondary recrystallized sheet after secondary recrystallization annealing.

The chemical composition in the case of producing the grain-oriented electrical steel sheet is not limited, and may be any chemical composition. The chemical composition preferably contains Si in a range of 2.0 mass % to 8.0 mass %, from the viewpoint of reducing the iron loss in the grain-oriented electrical steel sheet. The chemical composition preferably contains Si in a range of 2.5 mass % to 4.5 mass %, from the viewpoint of the sheet passage property.

A suitable chemical composition besides Si in the case of producing the grain-oriented electrical steel sheet is as follows. The chemical composition is, however, not limited to the following chemical composition, and the presently disclosed techniques can reliably improve the iron loss property of all kinds of grain-oriented electrical steel sheets.

C: 0.01 mass % to 0.08 mass %

C is an element necessary to improve the texture in the primary recrystallization. To achieve this effect, the C content is preferably 0.01 mass % or more. From the viewpoint of appropriately reducing the C content to such an amount that causes no magnetic aging in the primary recrystallization annealing, the C content is preferably 0.08 mass % or less. The C content is more preferably 0.03 mass % or more. The C content is more preferably 0.07 mass % or less.

Mn: 0.005 mass % to 1.0 mass %

Mn is an element effective in improving the hot workability. To achieve this effect, the Mn content is preferably 0.005 mass % or more. From the viewpoint of achieving more favorable magnetic flux density, the Mn content is preferably 1.0 mass % or less. The Mn content is more preferably 0.010 mass % or more. The Mn content is more preferably 0.2 mass % or less.

The basic components besides the foregoing components of the steel material used in the method of producing a grain-oriented electrical steel sheet according to the present disclosure differ between in the case of using an inhibitor to induce secondary recrystallization and in the case of not using an inhibitor.

In the case of using an inhibitor to induce secondary recrystallization, the chemical composition contains any of various types of inhibitor components. For example, in the case of using a AlN-based inhibitor, the chemical composition preferably contains Al: 0.01 mass % to 0.065 mass % and N: 0.005 mass % to 0.012 mass %. In the case of using a MnS—MnSe-based inhibitor, the chemical composition preferably contains at least one of S: 0.005 mass % to 0.03 mass % and Se: 0.005 mass % to 0.03 mass %.

In the case of not using an inhibitor to induce secondary recrystallization, it is preferable to reduce Al, N, S, and Se which are inhibitor components respectively to Al: 0.0100 mass % or less, N: 0.0050 mass % or less, S: 0.0050 mass % or less, and Se: 0.0050 mass % or less.

In addition to the foregoing chemical composition, the steel material used in the production of a grain-oriented electrical steel sheet according to this embodiment may further contain one or more selected from the group consisting of Ni: 0.03 mass % to 1.50 mass %, Sn: 0.01 mass % to 1.50 mass %, Sb: 0.005 mass % to 1.50 mass %, Cu: 0.03 mass % to 3.0 mass %, P: 0.03 mass % to 0.50 mass %, Mo: 0.005 mass % to 0.10 mass %, and Cr: 0.03 mass % to 1.50 mass % for the purpose of further improving the magnetic properties, besides the foregoing basic components.

Ni is an element useful in improving the hot-rolled sheet microstructure and improving the magnetic properties. To achieve the magnetic property improving effect, the Ni content is preferably 0.03 mass % or more. From the viewpoint of appropriately growing secondary recrystallized grains and improving the magnetic properties, the Ni content is preferably 1.50 mass % or less. Sn, Sb, Cu, P, Mo, and Cr are elements useful in improving the magnetic properties. To achieve the magnetic property improving effect, the content of each of these elements is preferably not less than the foregoing lower limit. From the viewpoint of appropriately growing secondary recrystallized grains, the content of each of these elements is preferably not more than the foregoing upper limit.

The balance in the steel material used in the production of a grain-oriented electrical steel sheet according to this embodiment other than the foregoing components may consist of Fe and inevitable impurities. Since C is decarburized in the primary recrystallization annealing and Al, N, S, and Se are purified in the secondary recrystallization annealing, these components are reduced to inevitable impurity contents in the steel sheet (grain-oriented electrical steel sheet) after the secondary recrystallization annealing.

In the case of producing the grain-oriented electrical steel sheet, the angle of the scanning direction of the laser with respect to the sheet transverse direction (TD) of the metal strip is preferably 40° or less, from the viewpoint of enhancing the iron loss reduction effect. The scanning direction of the laser is more preferably parallel to the sheet transverse direction of the metal strip (that is, the angle of the scanning direction of the laser with respect to the sheet transverse direction of the steel sheet is preferably 0°). Laser scanning in the laser irradiation process is preferably performed periodically in the rolling direction of the steel sheet. In other words, it is preferable to repeatedly perform laser scanning so as to form resist removed parts at regular spacings in the rolling direction of the steel sheet. The spacing (hereafter also referred to as "resist removed part spacing") of the resist removed parts in the rolling direction of the steel sheet is preferably 2 mm or more. The resist removed part spacing is preferably 10 mm or less. Since the spacing (hereafter also referred to as "linear groove spacing") of the linear grooves formed by the etching treatment in the rolling direction is equal to the resist removed part spacing, by limiting the resist removed part spacing to this range, appropriate linear groove spacing can be achieved. This further improves the magnetic properties of the grain-oriented electrical steel sheet.

EXAMPLES

The presently disclosed techniques will be described in detail below by way of examples. The following examples are merely preferred examples according to the present disclosure, and the present disclosure is not limited to the following examples.

First Example

To evaluate the influences of the laser irradiation conditions on the linear groove form and the iron loss property of grain-oriented electrical steel sheets, linear grooves were formed on the surfaces of cold-rolled steel sheets under multiple conditions. The cold-rolled steel sheets used were each produced by hot rolling a steel slab having a composition containing C: 0.05 mass %, Si: 3.25 mass %, Mn: 0.01 mass %, Al: 0.029 mass %, N: 0.012 mass %, S: 0.005 mass %, and Se: 0.012 mass % (composition containing an inhibitor component) to obtain a hot-rolled steel sheet and thereafter cold rolling the hot-rolled steel sheet to obtain a cold-rolled steel sheet of 0.27 mm with a width of 1120 mm. A coating agent for resist coating formation was uniformly applied to both surfaces of this cold-rolled steel sheet entirely, by a gravure offset printing method. As the coating agent for resist coating formation, a coating agent for resist coating formation containing epoxy-modified melamine-alkyd resin and 40 mass % of magnesium oxide in terms of solid content was used. The coating amount of the resist coating (after drying) was 3.0 $g/m^2$.

After applying the coating agent for resist coating formation, the coating agent for resist coating formation was dried at 330° C. for 40 sec, thus forming a resist coating on the surface of the cold-rolled steel sheet. Following this, the surface of the cold-rolled steel sheet was irradiated with a laser while scanning the laser linearly in the sheet transverse direction of the cold-rolled steel sheet under the conditions shown in Table 1. The laser scanning was periodically performed at spacings of 3.5 mm in the rolling direction of the steel sheet. In this experiment, three irradiation devices of single mode fiber laser were installed side by side in the sheet transverse direction of the cold-rolled steel sheet, and the laser irradiation was performed by the three irradiation devices. The laser scanning rate, the irradiation energy, the beam diameter in the scanning orthogonal direction of the laser, and the major-to-minor axis ratio of the laser are shown in Table 1.

<Measurement of Resist Coating Removal Width>

For the cold-rolled steel sheet after the laser irradiation, the resist coating removal width was measured. The surface of the cold-rolled steel sheet after the laser irradiation was observed using an optical microscope. The width of the region in which the steel substrate was exposed in the laser irradiated part in the rolling direction was measured at ten points over a length of 1 mm in the scanning direction of the laser, and the average value of the measured values was taken to be the resist coating removal width. In the case where the difference between the resist coating removal width and the beam diameter in the scanning orthogonal direction was −80% or more and +180% or less with respect to the beam diameter in the scanning orthogonal direction of the laser, it was determined that the resist coating was able to be removed with a width substantially equal to the diameter of the laser applied.

Following this, the cold-rolled steel sheet after the laser irradiation was subjected to electrolytic etching, to form linear grooves on both surfaces of the cold-rolled steel sheet. A 25 mass % NaCl aqueous solution was used as an electrolytic solution, and the current density was adjusted beforehand so that the groove depth would be 20 μm in all cold-rolled steel sheets. The electrolysis conditions were electrolytic solution temperature: 20° C., current density: 4 $A/dm^2$ to 24 $A/dm^2$, and current passage time: 2 min. After the etching treatment, the resist coating remaining on the front and back surfaces of the cold-rolled steel sheet was removed in a NaOH aqueous solution. The solution temperature of the NaOH aqueous solution was maintained in a range of 50° C. to 70° C. After the etching treatment, the cold-rolled steel sheet was subjected to water washing and surface cleaning.

Subsequently, the cold-rolled steel sheet was subjected to primary recrystallization annealing at 850° C. to obtain a primary recrystallized sheet, thereafter the primary recrystallized sheet was subjected to secondary recrystallization annealing at 1000° C. to obtain a secondary recrystallized sheet, and thereafter a tension coating was formed on the secondary recrystallized sheet. For the resultant grain-oriented electrical steel sheet, the iron loss $W_{17/50}$ was measured in the same way as in Experiment 1. In the case where the iron loss $W_{17/50}$ was 0.80 W/kg or less, the iron loss property was determined as excellent. The measurement results are shown in Table 1.

17

<Measurement of Groove Width of Linear Grooves>

The depth profile of the linear grooves in the rolling direction was measured using a confocal laser microscope. The width in the rolling direction at a position of 90% in height was taken to be the groove width of each lineare groove, where the height of the rolled surface was 100% and the height of the deepest part of the groove was 0%. The groove width was measured at ten points in the laser scanning direction, and the measured values were averaged to yield the groove width of the linear groove. In the case where the difference between the groove width of the linear groove and the beam diameter in the scanning orthogonal direction of the laser was −70% or more and +500% or less with respect to the beam diameter in the scanning orthogonal direction of the laser, it was determined that a linear groove of desired width was able to be formed. In the case where the groove width of the linear groove was 10 μm or more and approximately 100 μm or less, the groove width of the linear groove was determined as favorable. The measurement results are shown in Table 1.

18

Second Example

Cold-rolled steel sheets before groove formation were produced in the same way as in the first example. A coating agent for resist coating formation containing water-based alkyd resin as a main component and containing 0 mass % to 95 mass % of silica in terms of solid content was uniformly applied to the whole surface of each cold-rolled steel sheet by a gravure offset printing method. The coating amount of the resist coating (after drying) was 3.0 g/m². After applying the coating agent for resist coating formation, the coating agent for resist coating formation was dried at 330° C. for 40 sec. Following this, the surface of the cold-rolled steel sheet was irradiated with a laser while scanning the laser linearly in the sheet transverse direction of the cold-rolled steel sheet under the conditions of scanning rate: 60 m/s, beam irradiation energy: 30 J/m, beam minor axis length: 50 μm, and beam major-to-minor axis ratio: 50. The laser scanning was periodically performed at spacings of 3.5 mm in the rolling direction of the cold-rolled steel sheet. In this experiment, three irradiation devices of single mode fiber laser were installed side by side in the

TABLE 1

| No. | Scanning rate (m/s) | Irradiation energy (J/m) | Beam diameter in scanning orthogonal direction (μm) | Major-to-minor axis ratio | Coating removal width (μm) | Groove width of linear groove (μm) | Iron loss $W_{17/50}$ (W/kg) | Remarks |
|---|---|---|---|---|---|---|---|---|
| 1 | 10 | 10 | 8 | 50 | 8 | 8 | 0.82 | Comparative Example |
| 2 | 10 | 10 | 10 | 3 | 53 | 134 | 0.83 | Comparative Example |
| 3 | 10 | 10 | 10 | 5 | 28 | 46 | 0.79 | Example |
| 4 | 10 | 10 | 10 | 10 | 19 | 31 | 0.78 | Example |
| 5 | 10 | 10 | 10 | 20 | 12 | 25 | 0.77 | Example |
| 6 | 10 | 10 | 10 | 50 | 11 | 18 | 0.77 | Example |
| 7 | 10 | 10 | 10 | 200 | 10 | 10 | 0.77 | Example |
| 8 | 10 | 10 | 50 | 50 | 50 | 50 | 0.77 | Example |
| 9 | 10 | 10 | 100 | 50 | 100 | 100 | 0.77 | Example |
| 10 | 10 | 10 | 120 | 50 | 120 | 120 | 0.81 | Comparative Example |
| 11 | 10 | 30 | 50 | 50 | 50 | 53 | 0.78 | Example |
| 12 | 10 | 40 | 50 | 50 | 50 | 55 | 0.79 | Example |
| 13 | 60 | 10 | 8 | 50 | 8 | 8 | 0.82 | Comparative Example |
| 14 | 60 | 10 | 10 | 3 | 52 | 139 | 0.83 | Comparative Example |
| 15 | 60 | 10 | 10 | 5 | 27 | 39 | 0.79 | Example |
| 16 | 60 | 10 | 10 | 50 | 11 | 17 | 0.77 | Example |
| 17 | 60 | 10 | 10 | 200 | 10 | 10 | 0.77 | Example |
| 18 | 60 | 10 | 100 | 5 | 106 | 117 | 0.79 | Example |
| 19 | 60 | 10 | 100 | 50 | 100 | 106 | 0.77 | Example |
| 20 | 60 | 10 | 120 | 50 | 120 | 123 | 0.82 | Comparative Example |
| 21 | 60 | 30 | 50 | 3 | 55 | 152 | 0.82 | Comparative Example |
| 22 | 60 | 30 | 50 | 5 | 29 | 51 | 0.79 | Example |
| 23 | 60 | 30 | 50 | 50 | 13 | 22 | 0.77 | Example |
| 24 | 60 | 40 | 50 | 3 | 54 | 155 | 0.83 | Comparative Example |
| 25 | 60 | 40 | 50 | 5 | 31 | 53 | 0.79 | Example |
| 26 | 60 | 40 | 50 | 50 | 17 | 24 | 0.77 | Example |
| 27 | 150 | 20 | 8 | 50 | 8 | 8 | 0.83 | Comparative Example |
| 28 | 150 | 20 | 10 | 3 | 61 | 167 | 0.82 | Comparative Example |
| 29 | 150 | 20 | 10 | 5 | 26 | 56 | 0.79 | Example |
| 30 | 150 | 20 | 10 | 200 | 10 | 10 | 0.77 | Example |
| 31 | 150 | 30 | 100 | 50 | 102 | 106 | 0.77 | Example |
| 32 | 150 | 30 | 120 | 50 | 122 | 125 | 0.82 | Comparative Example |
| 33 | 5 | 5 | 50 | 50 | 51 | 52 | 0.77 | Example |

Underlines indicate outside appropriate range according to the present disclosure.

As can be understood from the results in Table 1, in examples each using a linear groove formation method within the range according to the present disclosure, linear grooves of desired and favorable groove width were formed, and the iron loss property was better than that in comparative examples.

sheet transverse direction of the cold-rolled steel sheet, and the laser irradiation was performed by the three irradiation devices.

Following this, the cold-rolled steel sheet was subjected to electrolytic etching, to form linear grooves on the surface of the cold-rolled steel sheet. A 25 mass % NaCl aqueous solution was used as an electrolytic solution, and the current density was adjusted beforehand so that the groove depth of linear grooves would be 20 μm in all cold-rolled steel sheets. The electrolysis conditions were electrolytic solution temperature: 20° C., current density: 4 A/dm² to 24 A/dm², and current passage time: 2 min. After the etching treatment, the resist coating remaining on the front and back surfaces of the cold-rolled steel sheet was removed in a NaOH aqueous solution. After the etching treatment, the cold-rolled steel sheet was subjected to water washing and surface cleaning.

Subsequently, the cold-rolled steel sheet was subjected to primary recrystallization annealing at 850° C. to obtain a primary recrystallized sheet, thereafter the primary recrystallized sheet was subjected to secondary recrystallization annealing at 1000° C. to obtain a secondary recrystallized sheet, and thereafter a tension coating was formed on the secondary recrystallized sheet. For the resultant grain-oriented electrical steel sheet, the iron loss $W_{17/50}$ was measured in the same way as in Experiment 1. In the case where the iron loss $W_{17/50}$ was 0.80 W/kg or less, the iron loss property was determined as excellent. The measurement results are shown in Table 2.

TABLE 2

| No. | Inorganic compound content (mass %) | Coating removal width (μm) | Groove width of linear groove (μm) | Iron loss $W_{17/50}$ (W/kg) | Remarks |
|-----|-----|-----|-----|-----|-----|
| 1 | 0 | 1 | 6 | 0.83 | Comparative Example |
| 2 | 10 | 5 | 8 | 0.82 | Comparative Example |
| 3 | 15 | 8 | 9 | 0.81 | Comparative Example |
| 4 | 20 | 47 | 49 | 0.78 | Example |
| 5 | 40 | 48 | 50 | 0.77 | Example |
| 6 | 60 | 48 | 51 | 0.77 | Example |
| 7 | 80 | 49 | 51 | 0.77 | Example |
| 8 | 90 | 49 | 51 | 0.77 | Example |
| 9 | 95 | 50 | 52 | 0.79 | Example |

Underlines indicate outside appropriate range according to the present disclosure.

As can be understood from the results in Table 2, in examples each using a resist coating having an inorganic compound content of 20 mass % or more, linear grooves of desired and favorable groove width were formed, and the iron loss property was better than that in comparative examples.

REFERENCE SIGNS LIST

10 laser irradiation device
20 metal strip
30 laser
40 laser irradiated part

The invention claimed is:

1. A linear groove formation method comprising:
   forming a resist coating on at least one surface of a metal strip;
   thereafter irradiating the resist coating with a laser while scanning the laser in a direction crossing a rolling direction of the metal strip, to remove the resist coating in a part irradiated with the laser; and
thereafter performing etching treatment to form a linear groove in a part of the metal strip in which the resist coating is removed,
wherein the resist coating contains 20 mass % or more of an inorganic compound in terms of solid content, and
on the surface of the metal strip which has been coated and etched, the laser has an elliptic beam shape whose ratio of a major axis length to a minor axis length is 5.0 or more, and has a beam diameter of 10 μm or more and 100 μm or less in a direction orthogonal to a scanning direction of the laser.

2. The linear groove formation method according to claim 1, wherein an irradiation energy of the laser is 30 J/m or less.

3. A method of producing a grain-oriented electrical steel sheet, the method comprising:
   subjecting a steel slab to hot rolling to obtain a hot-rolled steel sheet;
   thereafter subjecting the hot-rolled steel sheet or a hot-rolled and annealed sheet obtained by performing hot-rolled sheet annealing on the hot-rolled steel sheet, to cold rolling once or to cold rolling twice or more with intermediate annealing being performed therebetween, to obtain a cold-rolled steel sheet;
   thereafter subjecting the cold-rolled steel sheet to primary recrystallization annealing to obtain a primary recrystallized sheet; and
   thereafter subjecting the primary recrystallized sheet to secondary recrystallization annealing to obtain a secondary recrystallized sheet,
   wherein linear grooves are formed on at least one surface of the steel sheet after the hot rolling, by the linear groove formation method according to claim 1.

4. A method of producing a grain-oriented electrical steel sheet, the method comprising:
   subjecting a steel slab to hot rolling to obtain a hot-rolled steel sheet;
   thereafter subjecting the hot-rolled steel sheet or a hot-rolled and annealed sheet obtained by performing hot-rolled sheet annealing on the hot-rolled steel sheet, to cold rolling once or to cold rolling twice or more with intermediate annealing being performed therebetween, to obtain a cold-rolled steel sheet;
   thereafter subjecting the cold-rolled steel sheet to primary recrystallization annealing to obtain a primary recrystallized sheet; and
   thereafter subjecting the primary recrystallized sheet to secondary recrystallization annealing to obtain a secondary recrystallized sheet,
   wherein linear grooves are formed on at least one surface of the steel sheet after the hot rolling, by the linear groove formation method according to claim 2.

5. The linear groove formation method according to claim 1, wherein the resist coating further contains a resin component.

* * * * *